United States Patent [19]

Egid

[11] 4,023,780
[45] May 17, 1977

[54] METHOD OF MIXING AND APPARATUS THEREFOR

[76] Inventor: Eugene I. Egid, 136 Harrington Ave., Westwood, N.J. 07675

[22] Filed: Sept. 3, 1975

[21] Appl. No.: 609,958

[52] U.S. Cl. .............................................. 259/102
[51] Int. Cl.² ....................................... B01F 7/00
[58] Field of Search ................. 259/114, 19, 37, 6, 259/111, 5, 21, 40, 64, 107, 108

[56] References Cited

UNITED STATES PATENTS

| 533,589 | 2/1895 | Hagley | 259/114 |
|---|---|---|---|
| 768,086 | 8/1904 | Sturma | 259/114 |
| 1,196,612 | 8/1916 | Taylor | 259/114 |
| 2,025,404 | 12/1935 | Stahn | 259/114 |
| 2,431,298 | 11/1947 | Nichols | 259/111 |
| 3,315,947 | 4/1967 | Nauta | 259/111 |
| 3,584,842 | 6/1971 | Sukup | 259/111 |

*Primary Examiner*—Richard E. Aegerter
*Assistant Examiner*—Lenard A. Footland
*Attorney, Agent, or Firm*—Robert A. Maikis

[57] ABSTRACT

Mixing apparatus is provided having a motor driven rotating head which is suspended above a fixed mixing bowl. A guide post is pivotally mounted on the head for oscillative rotation about the axis of rotation of the head and eccentric drive means are mounted on the head and spaced from the guide post. A connecting rod has one end thereof connected to the eccentric drive and is slidably received by the guide post to produce said oscillative rotation of the guide post and a slidable oscillation of the rod relative to the guide post. A mixing paddle has an arm portion pivotally connected to the guide post for oscillative rotation therewith and oscillative swinging about an axis transverse of the axis of oscillative rotation. Link means pivotally connect the paddle arm portion and the other end of the rod to produce said oscillative swinging of the paddle. The simultaneously performed steps of rotatively oscillating the mixing paddle about the axis of rotation of the head, swingably oscillating the paddle about an axis transverse of the axis of rotation, and causing the paddle to continuously rotate with the head produce a method of mixing in which the paddle has a three-dimensional oscillatory motion along a spherically-oriented closed path resembling a "figure 8" during the rotation, so that the paddle has with respect to the bowl a three-dimensional continuous motion along a spherically-oriented open path resembling a series of radially-disposed overlapping lobes. When the number of cycles of said three-dimensional oscillatory motion completed by the paddle during a single rotation of the head is a circulating decimal, the open path traced by the mixing paddle with respect to the bowl will never be repeated during operation of the mixer.

15 Claims, 11 Drawing Figures

METHOD OF MIXING AND APPARATUS THEREFOR

BACKGROUND OF THE INVENTION

1. Field of the Invention

This invention relates generally to mixing and more particularly to a method of mixing and apparatus therefor having a novel, three-dimensional mixing motion with a non-repetitive mixing pattern which is especially adapted for applications requiring fine, non-destructive mixing.

2. Description of the Prior Art

Mixing devices are presently employed in a wide variety of fields including the pharmaceutical, drug, chemical and food industries, for example. Many of the applications in these industries require non-destructive mixing in which dry or semi-moist solid materials are mixed in a manner which will not destroy or impair the individual physical properties of the materials being mixed. If conventional mixers of the type having beaters rotating at high speeds are employed, the materials being mixed are often ground and beaten to the point where they lose their original properties. In the food industry, for example, non-destructive mixing applications arise when relatively fragile foods or ingredients, such as shelled nuts, for example, must be mixed with other substances in a manner which will not grind the nuts or reduce them to small fragments.

Other problems arising in the mixing of materials include generation of heat and thoroughness of the mixing action. When high speed mixers are employed to increase the efficiency of the mixer and produce a more thorough mixing action, the materials being mixed are often raised in temperature because of the high speed working and movement of the materials. In many fields of use, such as the fine chemical and pharmaceutical industries, for example, a substantial rise in temperature of the materials being mixed could have a deleterious effect on the chemical and physical properties of the materials and, consequently, resort is often had to expensive cooling systems for the mixing bowls which keep the temperature of the mixed materials within prescribed limits. When a slower mixing speed is utilized, the temperature problems are minimized but the desired small temperature rise is often obtained at the expense of the thoroughness of the mixing action. For this reason, mixing apparatus having a large number of mixing arms and other appendages which follow complicated mixing patterns have been developed. Needless to say, this type of mixer is not only expensive to manufacture but is also expensive and time consuming to maintain. A suitable mixer for fine mixing and other industrial applications should also exhibit low vibration and noise characteristics, be suitable for use with mixing bowls of different shapes, and be usable with partially-filled mixing bowls as well as filled mixing bowls.

SUMMARY OF THE INVENTION

It is an object of this invention to provide a mixer having a novel, three-dimensional mixing pattern which is especially adapted for use in applications requiring a very thorough mixing action without destruction or impairment of the physical properties of the materials being mixed.

It is a further object of this invention to provide a mixer having a continuously rotating mixing paddle which is subjected to both rotative and swingable oscillation about transverse axes to produce a non-repeating, spherically-oriented mixing path resembling a series of radially-disposed overlapping lobes.

It is a still further object of this invention to provide a mixer having a mixing paddle which is operated at very low rotational speeds but substantially high curvilinear swinging speeds.

It is another object of this invention to provide a non-destructive mixer having extremely low vibration and noise characteristics and which requires minimum maintenance and repair.

It is an additional object of this invention to provide a mixer having a mixing paddle which performs the dual mixing actions of levitation and rotation and wherein the same mixing path is never repeated by the mixing paddle during successive cycles of operation.

It is another object of this invention to provide a mixer wherein the mixing bowl is stationary and the mixing head and paddle are movable with respect to the bowl.

It is an additional object of this invention to provide a mixer which is suitable for use with mixing bowls of different shapes and sizes and wherein the mixing efficiency is not adversely affected when partially-filled mixing bowls are employed.

It is another object of this invention to provide a method of mixing with a mixing paddle and mixing bowl wherein the mixing paddle has with respect to the bowl a three-dimensional continuous motion along a spherically-oriented open path resembling a series of radially-disposed overlapping lobes.

Briefly, the mixer of the invention comprises support means having a base portion which is adapted to receive a mixing bowl and rotatable head means mounted on said support means above the base portion thereof. Motor means are coupled to the head means for rotation thereof and guide means are pivotally mounted on the head means for oscillative rotation with respect thereto. Eccentric drive means which are mounted on the head means and spaced from the guide means are pivotally connected to one end of connecting rod means which are slidably received by the guide means for rotative oscillation of the guide means and slidable oscillation of the rod means relative to the guide means. Mixing paddle means having an arm portion pivotally connected to the guide means for rotative oscillation therewith and swingable about an axis transverse of the axis of rotative oscillation of the guide means are utilized with link means pivotally connected between the paddle means arm portion and the other end of the rod means to produce oscillative swinging of the paddle means about the swinging axis thereof. The eccentric drive means, guide means, connecting rod means, paddle arm portion and link means function as a three-dimensional motion producing means which causes the paddle means to have with respect to the head means a three-dimensional oscillatory motion along a spherically-oriented closed path resembling a "figure 8". The continuous rotation of the head means causes the paddle means to have with respect to the mixing bowl a three-dimensional continuous motion along a spherically-oriented open path resembling a series of radially-disposed overlapping lobes. When the number of cycles of three-dimensional oscillatory motion completed by the paddle means during a single rotation of the head means is a circulating decimal, the open path traced by the mixing paddle means during successive revolutions of the head means will never be repeated. The mixing paddle means may have any number of shapes or configurations and may, for example, comprise a plurality of substantially coplanar vanes extending from opposite sides of the mixing arm portion, so that both the longitudinal and rotational mixing actions of the mixer are enhanced.

The foregoing mixing action constitutes a method of mixing for a mixing paddle and mixing bowl comprising the simultaneously performed steps of retatively oscillating the mixing paddle about an axis passing through the center of the bowl, swingably oscillating the mixing paddle about an axis transverse of the first-named axis, and causing continuous relative rotation between the paddle and bowl about the first-named axis, so that the mixing paddle keeps repeating the aforementioned three-dimensional oscillatory motion resembling a figure 8 during said relative rotation between the bowl and paddle, whereby the paddle has with respect to the bowl the aforementioned three-dimensional continuous motion along a spherically-oriented open path resembling a series of radially-disposed overlapping lobes. It is believed apparent that the method of mixing set forth herein may be performed by apparatus other than the apparatus described herein and that the method may also be performed by hand using commercially-available mixing bowls and paddles.

The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
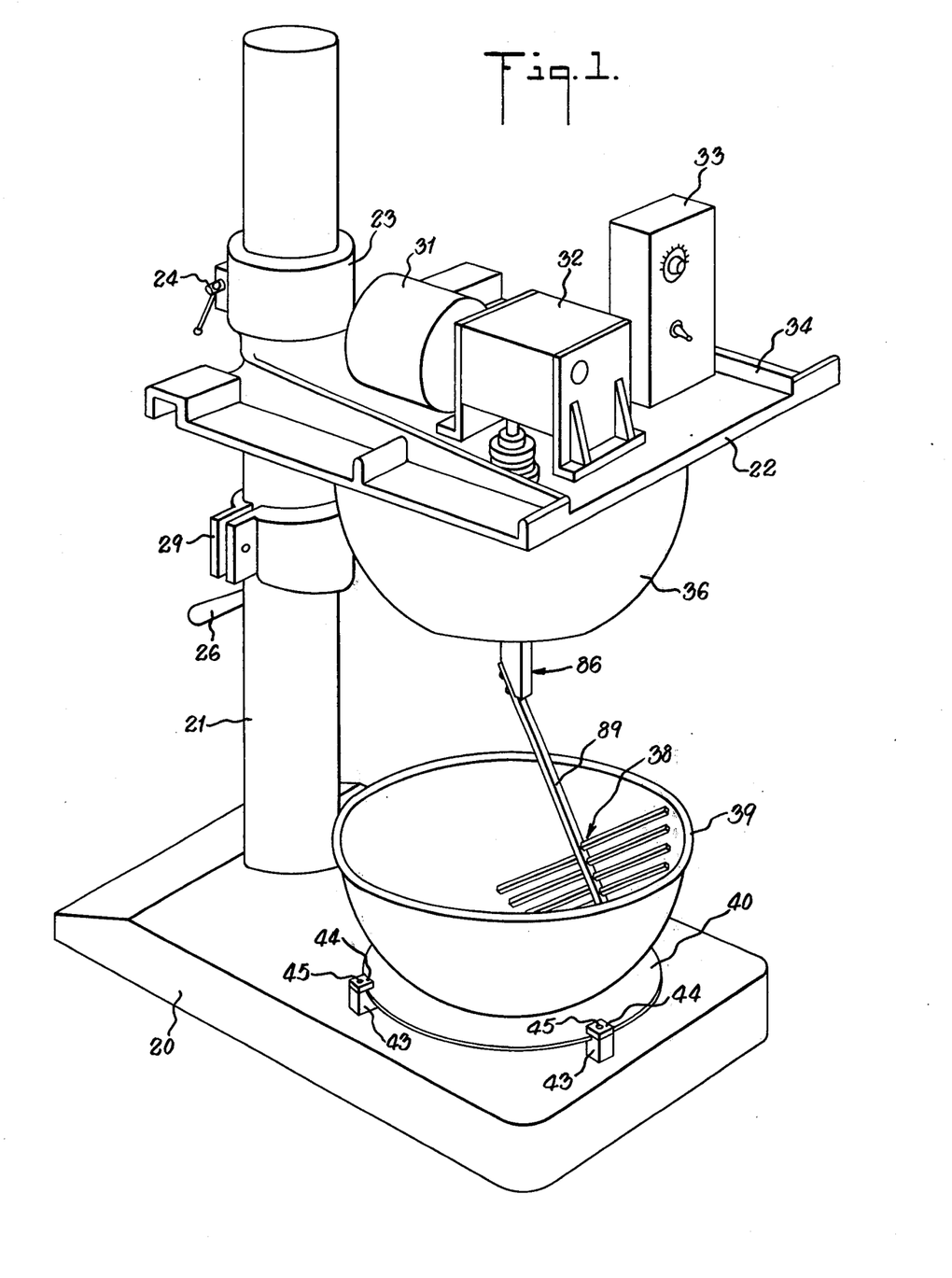
FIG. 1 is a perspective view of a mixer constructed in accordance with the teachings of the present invention.

Referring now to FIG. 1 of the drawings, there is shown a mixer constructed in accordance with the teachings of the present invention comprising a rectangular base support plate or base portion 20 having an upright support column 21 extending therefrom. A rectangular main head support plate 22 having an integral split yoke or collar assembly 23 is secured to the upright column 21 by a rotatable bolt 24 which threadedly engages the split portions of the yoke to provide a vise-type of clamping assembly. The base portion 20, support column 21 and head support plate 22 form the support means for the mixer of the invention. When the clamping assembly is loosened, the main head support plate 22 may be raised or lowered on the support column 21 by means of a gear assembly 25 shown in FIG. 2 of the drawings which is manually actuated by a rotatable handle 26. The raising and lowering mechanism for the mixer head also includes an elongated threaded rod 27 which depends from a collar 28 which is slidably mounted on the upright support column 21. The gear assembly 25 may comprise any one of a number of well known gear train configurations for raising and lowering the collar 28 along the support column 21, such as a bevel gear train driven worm gear which engages the rod 27, for example. The gear assembly 25 is secured by a split collar 29 and bolts 30 to the support column 21 so that it may be raised or lowered with respect to the base member 20 of the mixer to facilitate placement of the handle 26 at a convenient height for the operator of the mixer. When the gear assembly is being raised or lowered, the clamping mechanism 24 holds the relatively heavy head assembly in place and prevents downward movement of the assembly along the support column 21. If desired, the raising and lowering mechanism for the mixer head assembly may be motorized for convenience of operation in accordance with known techniques.

Figure 2:
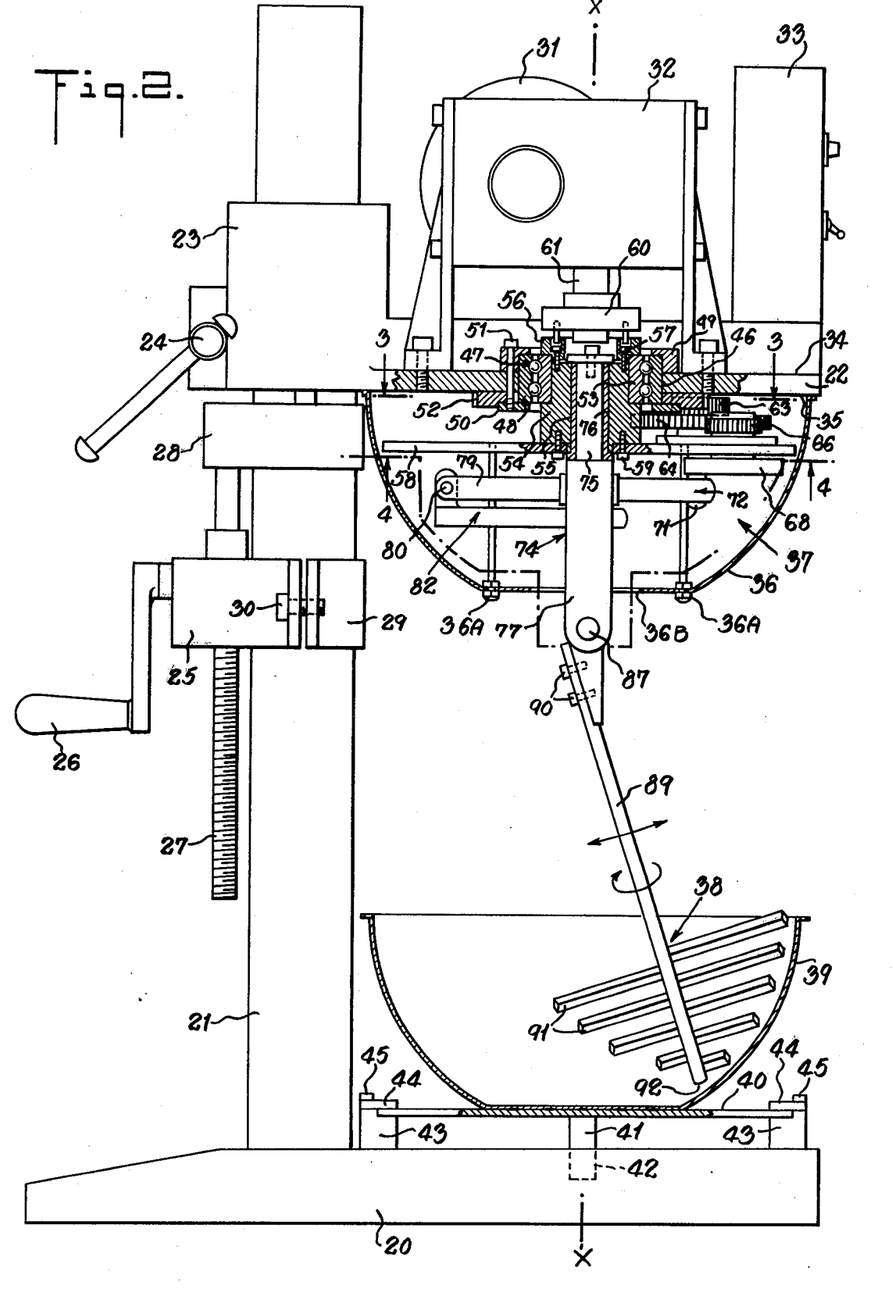
FIG. 2 is a side elevational view, partly in section, of the mixer shown in FIG. 1 of the drawings.

The mixing head main support plate 22 is provided with motor means, for example a variable speed motor 31, for example a speed reducer unit 32 and a solid state motor speed control 33 on the upper side 34 thereof. The lower side 35 of the support plate 22 is provided with a guard cover 36 which serves to enclose a three-dimensional motion producing mechanism which actuates mixing paddle means indicated generally as 38. A mixing bowl 39 is fixedly mounted on a circular bowl mounting plate 40 which is centered with respect to the mixing head by centering pin means 41 which depends from the bottom of the plate 40 and is inserted in centering aperture means 42 located in the base support member 20 of the mixer. The bowl support plate 40 rests on three support pads 43 and is clamped in place by cap plates 44 and screws 45, so that the mixing bowl 39 is held in a stationary position. The pin means 41 and aperture means 42 combine to form means for centering the bowl 39 with the center thereof in alignment with a vertically-disposed central mixer axis X-X, while the plate 40, pads 43, plates 44 and screws 45 provide means for fixedly mounting the bowl on the support means base portion 20.

The three-dimensional motion producing mechanism which actuates the mixing paddle 38 is shown in detail in FIGS. 2 through 6 of the drawings wherein it is seen that the main head support plate 22 is provided with a circular opening 46 which receives a double-row angular contact bearing indicated generally as 47. The outer race 48 of the bearing is held in place in the opening 46 by means of an annular or ring-shaped upper bearing housing 49 and an annular bottom plate 50 which are secured together by three bolts 51 which pass through openings in the main support plate 22. A large, annular spur gear 52 is disposed concentrically about the bearing 47 and is held stationary against the main support plate 22 by the three mounting bolts 51. The inner race 53 of the bearing receives a stepped shaft 54 having a circular bore 55 formed therein. The shaft 54 is secured to the inner bearing race 53 by a stepped annular upper ring 56 and three screws 57 which secure the ring to the stepped shaft. A circular head plate or head means 58 is secured to the lower end of the hollow shaft 54 by means of three screws 59, so that the head plate 58 is rotatable with the inner bearing race 53 about the central, vertically-disposed mixer axis X—X which passes through the center of the mixing bowl 39 and the centering pin 41 thereon. The stepped ring 56 which is secured to the hollow shaft 54 is connected through a clutch or coupling 60 to the output shaft 61 of the speed reducer mechanism 32. The input to the speed reducer 32 is connected by means (not shown) to the output shaft of motor 31 so that the circular head plate 58 is rotated about the central mixer axis X—X by the motor 31. The motor 31, which may, for example, comprise a variable speed motor having an output of about 1700 RPM is coupled to the rotatable head plate 58 through the speed reducer unit 32 so that the head plate 58 will rotate at a relatively low speed, such as 8 RPM, for example. In practice, the speed reducer unit 32 may comprise any one of a number of commercially-available, known units, such as a double worm gear reducer, for example, and the output speed of motor 31 may be controlled by known types of speed control circuits, such as the solid state unit 33, for example. By virtue of the arrangement, the rotational speed of head support plate 58 may be controlled by the speed control 33.

Figure 3:
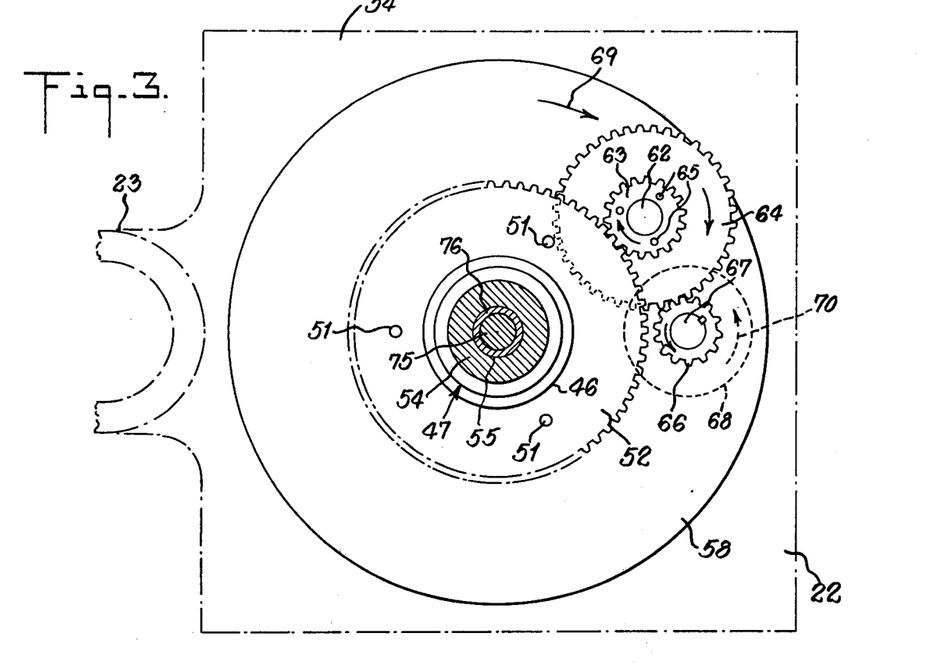
FIG. 3 is a top plan view, partly in section, of the mixer head taken along the line 3—3 in FIG. 2 of the drawings.
Figure 4:
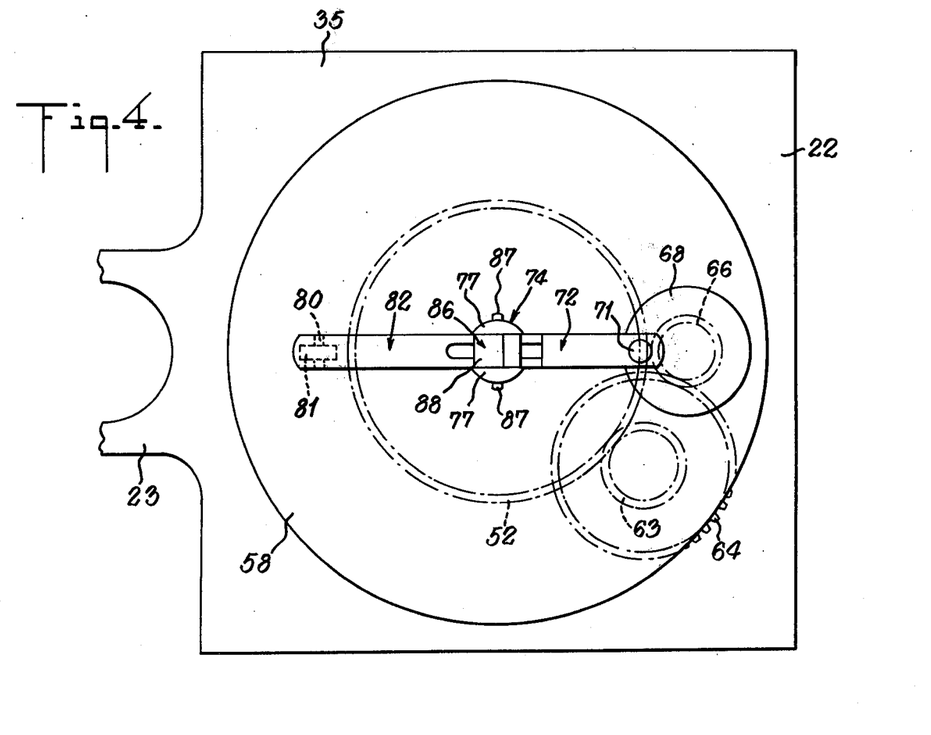
FIG. 4 is a bottom plan view of the mixer head taken along the line 4—4 in FIG. 2 of the drawings.

As seen in FIGS. 2 and 3 or the drawings, the upper side of the rotatable head plate 58 is provided with a fixed shaft or pin 62, the axis of which is parallel to the central mixer axis X—X and spaced a distance therefrom. A small spur gear 63 and a larger intermediate gear 64 are keyed together by pins 65, so that both gears rotate about shaft 62. The smaller gear 63 is arranged to engage the stationary large spur gear 52, so that the gears 63 and 64 will rotate when the circular head plate 58 is rotated by the motor 31. The intermediate gear 64 drives a smaller pinion gear 66 which is keyed to the rotatable shaft 67 of a circular crank member 68 which is located on the bottom side of the head support plate 58. Accordingly, as seen in FIG. 3, as the circular support plate 58 is rotated in the direction of the arrow 69, means 63, 64 and gear 66 cause the circular crank member 68 to be rotated in the opposite direction as indicated by arrow 70. For reasons which will be explained hereinafter, the gear ratios of gears 52, 63,64 and 66 are so arranged that the ratio of the rate of rotation of the crank member 68 to the rate of rotation of the circular head plate 58 is a "circulating decimal" which is defined as a decimal fraction repeating a set of figures without end. For example, the gear ratios may be so designed as to produce 10.416666----6 rotations of the crank member 68 for a single revolution of the head support plate 58. In the example given, 10.416666---6 is a circulating decimal where the least significant digit 6 is repeated an infinite number of times.

As seen in FIGS. 2, 4, 5 and 6 of the drawings, the rotatable crank 68 is provided with pivot point or a pin 71 which is pivotally connected to one end of connecting rod means 72. The pin 71 is offset from the rotational axis of the crank member 68 so that the crank member and pin 71 function as eccentric drive means for the connecting rod 72. The connecting rod 72 is slidably received by an opening 73 in a guide post or guide means indicated generally as 74. The guide post 74 has a circular shaft 75 formed at the upper end thereof which is seated for rotation in an elongated cylindrical sleeve bearing 76 which is disposed in the opening 55 of the hollow shaft 54, so that the guide post is rotatable with respect to the head plate 58 about the X—X mixer axis. The lower end of the guide post is forked to provide spaced apart fork arms 77 which are separated by an opening 78 which is substantially parallel to the transverse opening 73 in the guide post. Accordingly, as the crank member 68 of the eccentric drive is rotated, the guide post 74 will be rotatably oscillated with respect to the head plate 58 about the central mixer axis X—X which is coincident with the axis of rotation of the head plate and the connecting rod 72 will be slidably oscillated with respect to the guide post along an axis substantially perpendicular to the main mixer axis X—X. The other end 79 of the connecting rod 72 may be forked or split and provided with a pin 80 on which is pivotally mounted an angulate projecting lug 81 formed on one end of a linkage or link means 82. The link 82 extends through the opening 78 formed in the guide post 74 and is provided at the other end 83 thereof with a pivot pin 84 on which is pivotally mounted one end 85 of a lever indicated generally as 86 which functions as the second section of a two-section portion of the paddle means 38. The paddle arm section or lever 86 extends between the forks 77 of the guide post in the space 78 and is pivotally mounted between the forks by means of a pin 87, so that the paddle arm section is mounted for rotative oscillation with the guide post and about the central axis X—X of the mixer and is also swingable about an axis transverse of the axis of rotative oscillation of the guide post. The other end 88. of the second paddle arm section 86 is tapered to receive the first section 89 of the mixing paddle arm. The first paddle arm section 89 is removably mounted on the tapered end 88 of the second paddle arm section 86 by means of two screws 90 so that the mixing paddle may be easily removed for cleaning or for the installation of a paddle having a different configuration as will be explained hereinafter.

Figures 5, 6, 6A:
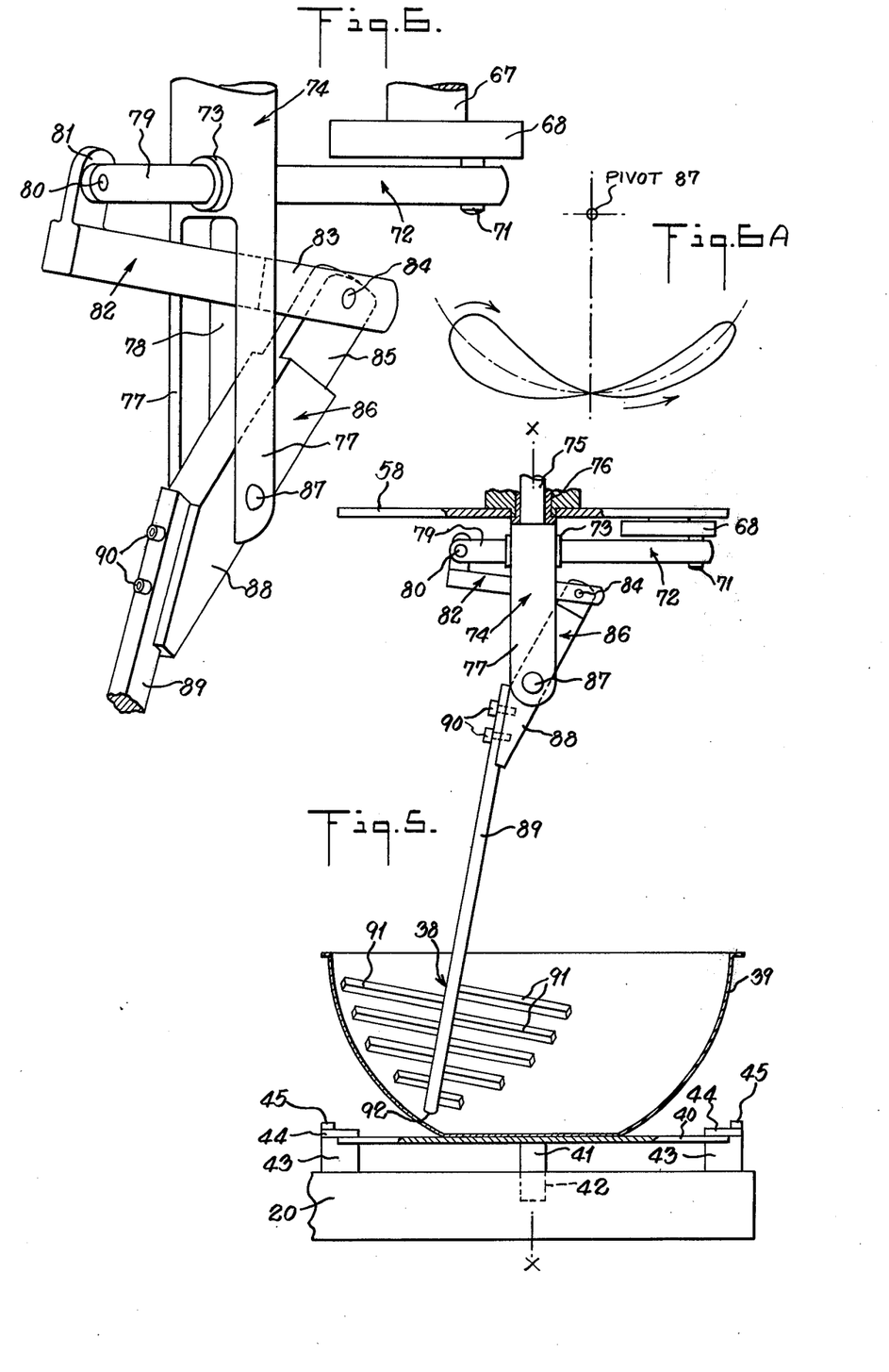
FIG. 5 is a side elevational view, partly in section, of the three-dimensional motion producing mechanism of the mixer head, the mixing paddle and mixing bowl showing the mixing paddle at the other end of its swinging stroke.
FIG. 6 is a perspective view of the three-dimensional motion producing mechanism of the mixer head assembly.
FIG. 6A is a schematic diagram of the closed path traced by the tip of the mixer paddle if the head plate is held stationary and the eccentric crank rotated.

As seen in FIGS. 2 and 5 of the drawings, the mixing paddle means 38 is provided with a paddle portion comprising a plurality of substantially copolanar and parallel vanes 91 which extends from opposite sides of the paddle arm section 89. Since the mixer paddle 38 is swingable about the axis formed by pivot pin 87 which intersects and is substantially perpendicular to the central mixer axis X—X about which the head plate 58 rotates, it is apparent that the tip 92 of the paddle arm section 89 will always describe an arc which is a segment of a circle having its center at the pin 87. Accordingly, when the particular shape of the mixing bowl 39 to be employed has been determined, the relative lengths of the vanes 91 on both sides of the paddle arm section 89 are then designed to accomodate that shape, so that the oscillatory swinging of the paddle 38 about the pin 87 will bring the ends of the vanes into close proximity with the wall of the mixing bowl but will not permit the vanes 91 to touch the wall of the bowl. It will be noted that the paddle arm sections 86 and 89 are angularly disposed with respect to each other in the plane in which the paddle 38 swings and that the angle between the sections is such that the first section 89 on which the paddle is mounted is located for movement through an arc extending on both sides of the axis of rotative oscillation of the guide post 74. The aforementioned arc of movement of section 89 may be clearly seen by comparing FIGS. 2 and 5 of the drawings wherein FIG. 2 shows the paddle at one extreme of its oscillative swing with the eccentric crank 68 in the position shown and FIG. 5 shows the paddle at the other extreme of its swing when the crank 68 has been rotated 180°. As will be described hereinafter, the angulate offsetting of the two sections of the paddle arm causes the paddle arm to have a three-dimensional oscillatory motion along a spherically-oriented closed path resembling a figure 8 when the eccentric crank is rotated but the head plate 58 is stationary. It will also be noted that the paddle arm sections 86 and 89 may be integrally formed as a single part, if desired. The use of two separate sections, however, does facilitate the removal of the mixing paddle for cleaning and changing. Because of the angulate offset of arm section 86 with respect to arm section 89, it is apparent that the vanes 91 on one side of the arm section 89 are made shorter than the vanes on the other side, so that oscillate swinging of the paddle will not cause the vanes to touch on either side of the mixing bowl.

In the aforementioned mixer of the invention, the three-dimensional motion producing means comprising the guide post 74, eccentric crank 68, connecting rod 72, link 82 and paddle arm sections 86 and 89 are all supported by and mounted for rotation with the head plate 58, so that the entire motion producing means and mixing paddle 38 slowly rotate with the head plate about the central mixer axis X—X. Accordingly, motor means 31 which is coupled to head plate 58 for rotation thereof serves as means for producing continuous relative rotation between the rotatable three-dimensional motion producing means and the stationary mixing bowl about the central mixer axis X—X. The guard cover 36 which encloses the head plate 58 and motion producing mechanism is mounted for rotation with the head plate and is supported by the head plate by means of bolts 36A which threadedly engage the head plate. An opening 36B is formed in the bottom of the guard cover 36 to permit rotatable and swingable oscillation of the paddle arm section 86 and rotatable oscillation of the guide post 74. The major structural parts of the mixer, such as the base 20, support column 21, raising and lowering mechanism 25, collar 28, clamping assembly 24, main head support plate 22, rotating head support plate 22, rotating head plate 58 and the various shafts, for example, may be fabricated of steel or other materials having good structural strength while parts, such as the mixing paddle and guard cover, for example, may be fabricated of lighter weight materials, such as aluminum or magnesium alloys, if desired. The mixing paddle and mixing bowl should be formed of materials which do not chemically react with the materials being mixed.

The previously described structure produces a complex mixing action which will now be described. Since the motion of the mixing paddle as the head plate revolves around the central mixer axis X—X is relatively complex, it will be assumed initially that the circular head plate 58 is held stationary but the eccentric shank 68 is rotated independently by some means. As the crank 68 is rotated, the offset pivotal linkage with connecting rod 72 causes the guide post 74 to rotatively oscillate about the central mixer axis X—X, since the guide post is mounted for rotation in the sleeve bearing 76. Accordingly, the guide post will rotatively oscillate with respect to the circular head plate 58 as the crank is rotated. Simultaneously, with this action, the connecting rod 72 will slidably oscillate in the transverse opening 73 formed in the guide post with the slidable oscillation occurring along an axis which is transverse of the axis of oscillatory rotation of the guide post. The slidable oscillation of the connecting rod 72 causes the mixing paddle 38 to swingably oscillate about the axis of the pivot 87, so that the tip 92 of the mixing paddle describes an arc which is a segment of a circle within the mixing bowl 39. At the same time, however, the rotative oscillation of the guide post 74 with respect to the head plate 58 causes a rotative oscillatory movement of the paddle 38 within the mixing bowl 39, so that the tip 92 of the paddle has a three-dimensional oscillatory motion along a spherically-oriented closed path which resembles a figure 8 as illustrated in FIG. 6A of the drawings. In looking at FIG. 6A, it will be appreciated that the figure 8 path is described on the surface of a sphere having its center at the intersection of pivot pin 87 and the central mixer axis X—X because of the combined rotative and swingable oscillation of the mixing paddle 38. For further details concerning the construction and operation of the three-dimensional motion producing mechanism described herein and illustrated in FIG. 6 of the drawings, reference is made to U.S. Pat. No. 3,444,746 granted to Eugene I. Egid on May 20, 1969 for "Three Dimensional Motion-Producing Mechanism".

Figure 7:
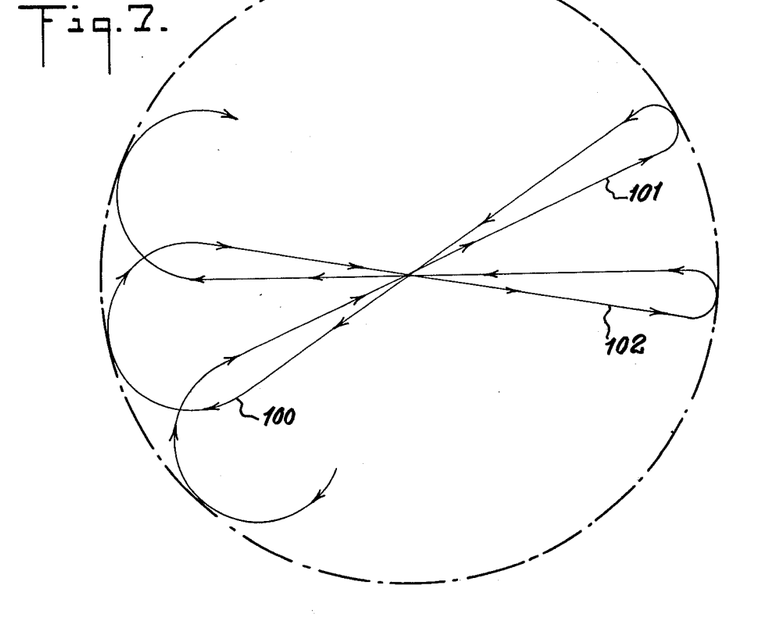
FIGS. 7, 8 and 9 are schematic diagrams of various portions of the open mixing path traced by the mixing paddle as seen from the top of the mixing bowl.
Figure 8:
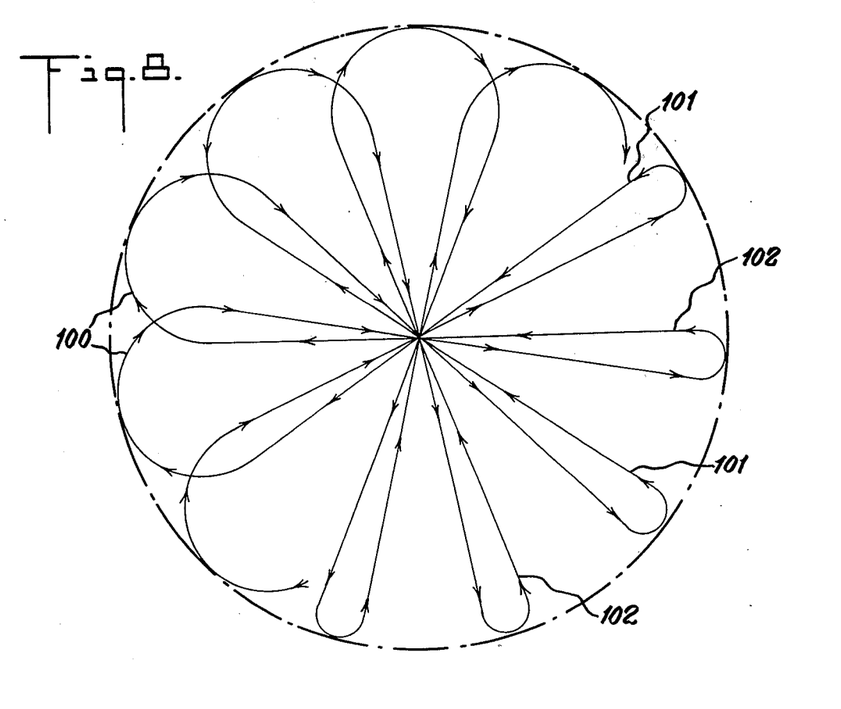
Figure 9:
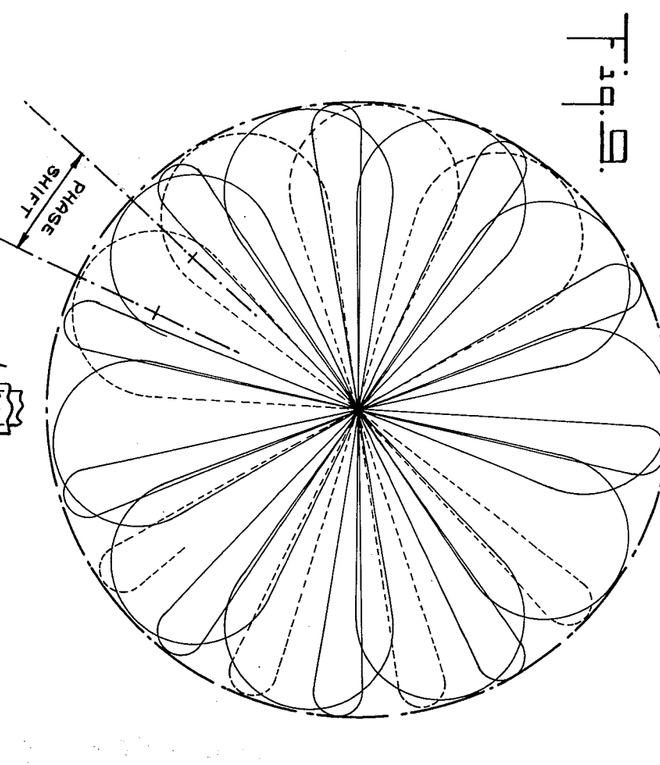

The foregoing description of the motion of the mixer paddle 38 is predicated upon the assumption that the rotatable head plate 58 is held stationary and the eccentric crank 68 is rotated by independent means. With the structure described herein, however, it is the rotation of the head plate 58 by the motor 31 which produces the rotation of the eccentric crank 68. Consequently, during the time when the aforementioned three-dimensional oscillatory motion of the paddle is being produced, the three-dimensional motion producing mechanism and mixing paddle are being continuously rotated by the head plate 58 about mixer axis X—X. Accordingly, the tip 92 of the paddle will not follow the closed path illustrated in FIG. 6A of the drawings but will instead have a three-dimensional continuous motion with respect to the bowl along a spherically-oriented open path resembling a series of radially-disposed overlapping lobes as illustrated in FIGS. 7, 8 and 9 of the drawings. The motion patterns shown in these drawings represent the path traced by the tip 92 of the paddle arm 89 as that path is projected on a horizontal plane which is parallel to the base of the mixer. Since the paddle is continually swinging about the pivot 87 with an oscillatory motion and being rotatively oscillated about the X—X axis and the head plate 58 is being continuously rotated in one direction of rotation, the paths shown in these figures of the drawings are actually traced on a portion of a spherical surface having its center at the intersection of the axis formed by pin 87 and the main mixer axis X—X.

As seen in FIG. 7, the tip 92 of the paddle 38 traces a path which consists of a series of overlapping large lobes 100 which are radially-disposed about the central mixer axis X—X. The generation of each large lobe 100 is accompanied by the generation of two smaller lobes 101 and 102 which are located on the opposite side of the mixer axis. These large lobes and accompanying smaller lobes are generated continuously as the mixer head plate 58 is rotated by the motor 31. FIG. 8 of the drawings shows the pattern produced by a rotation of approximately 180° of the head plate 58 in a clockwise direction in the plane of the drawing. As the mixing paddle swings and follows a spherical path, the vanes 91 of the paddle on one side of the paddle arm section 89 serve to levitate or raise the materials being mixed while the vanes on the opposite side of the paddle arm section tend to depress or force down the materials on that side. Consequently, the materials at the top of the bowl are forced to the bottom and the materials on the bottom of the bowl are brought to the top. It will be noted from an inspection of FIGS. 7 and 8 of the drawings that the paddle tip and vanes perform a wide sweeping motion as the paddle nears the side of the mixing bowl during the generation of the large lobes 100. This motion effectively spreads the materials being mixed in the horizontal plane. A similar spreading action occurs as the two smaller lobes 101 and 102 are generated on the opposite side of the bowl. Accordingly, the dual mixing action of the invention produces simultaneous levitation and lateral spreading of the materials being mixed and the action occurs progressively around the mixing bowl as the head plate 58 is continuously rotated. Furthermore, the three-dimensional motion producing mechanism which produces the figure 8 closed path oscillatory motion shown in FIG. 6A of the drawings causes the mixing paddle to have a relatively high curvilinear speed as the paddle is swung from side to side but a much lower speed as the paddle nears the wall of the mixing bowl and makes the lateral spreading motion. The slower speed of the paddle near the walls of the bowl helps in preventing spillage of the materials being mixed and permits the bowl to be filled to a higher level.

As mentioned previously, it is the rotation of the circular head plate 58 which produces rotation of the eccentric crank 68. If the ratio of the rate of rotation of the eccentric crank to the rate of rotation of the head plate is a circulating decimal, when the mixer head and paddle complete a full 360° rotation in the horizontal bowl plane, the start of the series of lobes produced during the next 360° rotation will be shifted in phase with respect to the start of the series of lobes for the first 360° rotation. The phase shift will be in an amount which is not divisible in 360°, so that the start of the mixing path at the beginning of each head revolution will occur at a different place. This phase shifting in the mixing pattern with each rotation of the head plate insures that the mixing paddle will never transverse the same path twice, so that every portion of the material in the bowl will eventually be subjected to the mixing action. With the parameters previously given of a ratio of 10.416666---6 rotations of the crank 68 to one revolution of the plate 58, the phase shift between successively occurring cyclic patterns will be about 17°. This phase shift in successive cycles of mixing patterns is shown in FIG. 9 of the drawings wherein the pattern traced during one revolution of the head is shown in solid line and the start of the pattern traced during the second revolution is shown in dotted line. Since the phase shift produced is not divisible into 360°, it is apparent that the pattern traced by the mixing paddle will never be repeated regardless of how long the mixer operates.

Figure 10:
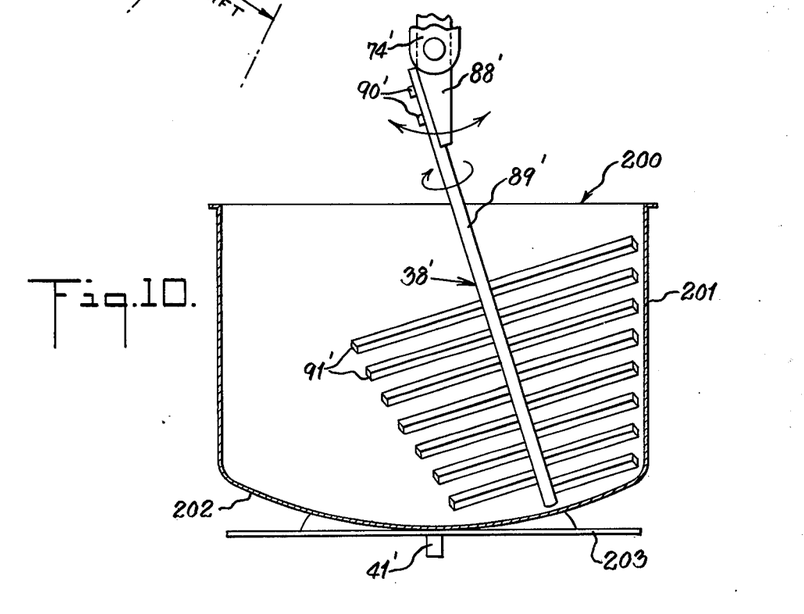
FIG. 10 is a side elevational view, partly in section, of an alternative form of mixing paddle and mixing bowl configuration.

FIG. 10 of the drawings illustrates an alternative configuration for the mixing paddle to accomodate a mixing bowl of different shape. In this figure of the drawings, reference numerals with a prime notation will be employed to designate components which are the same as or substantially similar to the corresponding components used in the embodiment of the invention shown in FIGS. 1 through 9 of the drawings. As seen in FIG. 10, the mixing bowl 200 has a substantially cylindrical side wall 201 and a curved bottom 202 which is fixedly secured to a bowl mounting plate 203. The bowl mounting plate 203 is provided with a centering pin 41' which is received by the centering aperture (not shown) in the base of the mixer. The vanes 91' of the mixing paddle 38' have relative lengths which provide a paddle configuration to fit the substantially vertical sides 201 of the mixing bowl, so that as the paddle 38' is swung from side to side within the bowl, the tips of the vanes do not touch the bowl sides. The mixing motion and pattern traced by the paddle are, however, identical to the motion and pattern of the paddle shown in FIGS. 1 through 9 of the drawings. Accordingly, it will be apparent that the mixer of the invention may be employed with mixing bowls of virtually any shape, size or configuration by suitably tailoring the vane structure to match the bowl walls. For efficiency of operation, however, the bowl should preferably be of circular shape in the horizontal plane because of the circular mixing pattern produced by rotation of the mixer head. Although the vanes of the mixing paddles shown in the embodiments of FIGS. 1-9 and FIG. 10 of the drawings are substantially coplanar in the plane in which the mixing paddle swings, it will be understood that the vanes may extend from the paddle at any desired angle or angles to suit a particular bowl configuration or mixing application.

The extremely low rotational speed of the mixer head plate and mixer paddle, which may, for example, be of the order of 8 RPM, produces little or no temperature rise of the materials being mixed and there is little or no vibration and noise. The slow mixing speed also permits mixing apparatus to be constructed having little wear and tear, to thereby reduce maintenance and repair costs. Additionally, the levitation and spreading actions of the paddle are performed at a low speed in a manner which provides the non-destructive mixing which is desirable for many applications. The dual mixing actions of levitation and spreading when combined with the non-repeating path traced by the mixer paddle insure that the mixing will be thorough and will be carried out at maximum efficiency. The mixing paddle of the disclosed mixer is also easily removable for cleaning and for changes made to accomodate mixing bowls of different shape. Finally, it will be apparent that the mixing efficiency of the mixer is not diminished when the mixing bowl is only partially filled since the path traced by paddle remains the same.

It is believed apparent that many changes could be made in the construction and described uses of the foregoing mixer and many seemingly different embodiments of the invention could be constructed without departing from the scope thereof. For example, the eccentric crank of the three-dimensional motion producing mechanism could be replaced by other types of eccentric drives and the particular type of three-dimensional motion producing mechanism illustrated could be replaced by other types providing the same motional pattern. Finally, it will be obvious that the method of mixing disclosed herein could be performed by other and different types of mixers and that the method could also be performed by hand. Accordingly, it is intended that all matter contained in the above description or shown in the accompanying drawings shall be interpreted as illustrative and not in a limiting sense.

What is claimed is:

1. A mixer comprising
   support means having a base portion adapted to receive a mixing bowl;
   head means rotatably mounted on said support means above said base portion thereof;
   motor means coupled to said head means for rotation thereof;
   guide means pivotally on said head means for oscillative rotation with respect thereto;
   eccentric drive means mounted on said head means and spaced from said guide means;
   connecting rod means pivotally connected at one end thereof to said drive means and slidably received by said guide means for rotative oscillation of the guide means and slidable oscillation of the rod means relative to the guide means;
   mixing paddle means having a paddle portion and an arm portion pivotally connected to said guide means for rotative oscillation therewith and swingable about an axis transverse of the axis of said rotative oscillation, said paddle means arm portion having a first section on which the paddle portion is disposed and a second section which is connected to said guide means with said pivotal connection, said first and second sections being angularly disposed with respect to each other in the plane in which the paddle means swings, the angle between said sections being such that said first section is located for movement through an arc extending on both sides of said axis of rotative oscillation; and
   link means pivotally connecting said second section of the paddle means arm portion and the other end of said rod means for oscillative swinging of said paddle means about the swinging axis thereof.

2. A mixer as claimed in claim 1
   wherein said first paddle arm section is removably connected to said second paddle arm section to facilitate removal and replacement of said paddle portion.

3. A mixer as claimed in claim 2
   wherein the paddle portion of said paddle means comprises a plurality of vanes extending from opposite sides of said first paddle arm section.

4. A mixer as claimed in claim 3
   wherein said vanes are substantially coplanar in said plane in which the paddle means swings.

5. A mixer as claimed in claim 4
   wherein the vanes on each side of said first paddle arm section are substantially parallel and have relative lengths corresponding to the shape of the mixing bowl with which the mixer is employed.

6. A mixer as claimed in claim 1
   wherein the number of cycles of oscillative swinging completed by said paddle means during a single revolution of said head means is a circulating decimal, so that the mixing patterns defined by the paddle means during successive revolutions of the head means are shifted in phase with respect to each other and the path traced by the paddle means is never repeated.

7. A mixer as claimed in claim 1
   wherein said eccentric drive means comprises a rotatable crank having an offset pivot point thereon connected to said one end of the rod means and
   wherein the ratio of the rate of rotation of said crank to the rate of rotation of said means is a circulating decimal, so that the mixing patterns defined by the paddle means during successive revolutions of the head means are shifted in phase with respect to each other and whereby the path traced by the paddle means is never repeated.

8. A mixer as claimed in claim 7
   wherein said guide means comprises a guide post pivotally disposed in said head means with the axis of rotative oscillation of the guide post coincident with the axis of rotation of the head means and
   wherein said rod means is slidably disposed in an opening extending through said guide post transverse of the axis of rotative oscillation thereof.

9. A mixer as claimed in claim 8
   wherein said rotatable crank is coupled to said rotatable head means for rotation thereby.

10. A mixer as claimed in claim 9 wherein
    said motor means is mounted on said support means and
    said head means comprises a rotatable plate coupled to said motor means for rotation thereby.

11. A mixer as claimed in claim 10 further comprising
    a non-rotatable spur gear fixedly mounted on said support means and concentrically disposed about the axis of rotation of said plate and
    gear means mounted on said plate for rotation therewith and coupled between said spur gear and said rotatable crank for rotating said crank upon rotation of said plate by the motor means.

12. A mixer as claimed in claim 8
    wherein said paddle means swinging axis intersects and is substantially perpendicular to the axis of rotative oscillation of said guide post.

13. A mixer as claimed in claim 12 further comprising
    a mixing bowl;
    means for centering said bowl with the center thereof in alignment with the axis of rotative oscillation of said guide post; and
    means for fixedly mounting said bowl on said support means base portion.

14. A mixer as claimed in claim 13 wherein said centering means comprises
    pin means mounted on said mixing bowl, and
    aperture means in said support means base portion for receiving said pin means.

15. A mixer as claimed in claim 13 wherein said mixing bowl mounting means comprises
    a mounting plate fixedly secured to said bowl, and
    clamp mounted on said support means base portion for clamping said mounting plate to said base portion.

* * * * *

UNITED STATES PATENT OFFICE
CERTIFICATE OF CORRECTION

Patent No. 4,023,780  Dated May 17, 1977

Inventor(s) Eugene I. Egid

It is certified that error appears in the above-identified patent and that said Letters Patent are hereby corrected as shown below:

Column 5, line 49, after the comma (,) (first occurence) insert --the gear--; and same line, after "and", delete "gear". Column 6, line 30, after "tion", insert --arm--; line 38, after "88", delete the period (.); and line 48, delete "copolanar" and substitute therefor --coplanar--. Column 7, line 14, "figure 8" should read --"figure 8"--; line 49, delete "rotating head"; line 50, delete "support plate 22,"; and line 64, delete "shank" and substitute therefor --crank--. Column 8, lines 19 and 21 and column 9, line 28, "figure 8" should read --"figure 8"--. Column 11, line 13, after "pivotally", insert --mounted--. Column 12, line 8, after "said", insert --head--; and line 60, after "clamp", insert --means--.

Signed and Sealed this

Fourth Day of October 1977

[SEAL]

Attest:

RUTH C. MASON
*Attesting Officer*

LUTRELLE F. PARKER
*Acting Commissioner of Patents and Trademark*